Dec. 1, 1936.         F. PERAZZO ET AL         2,062,819
BRAKE ADJUSTING DEVICE
Filed May 24, 1935         2 Sheets-Sheet 1
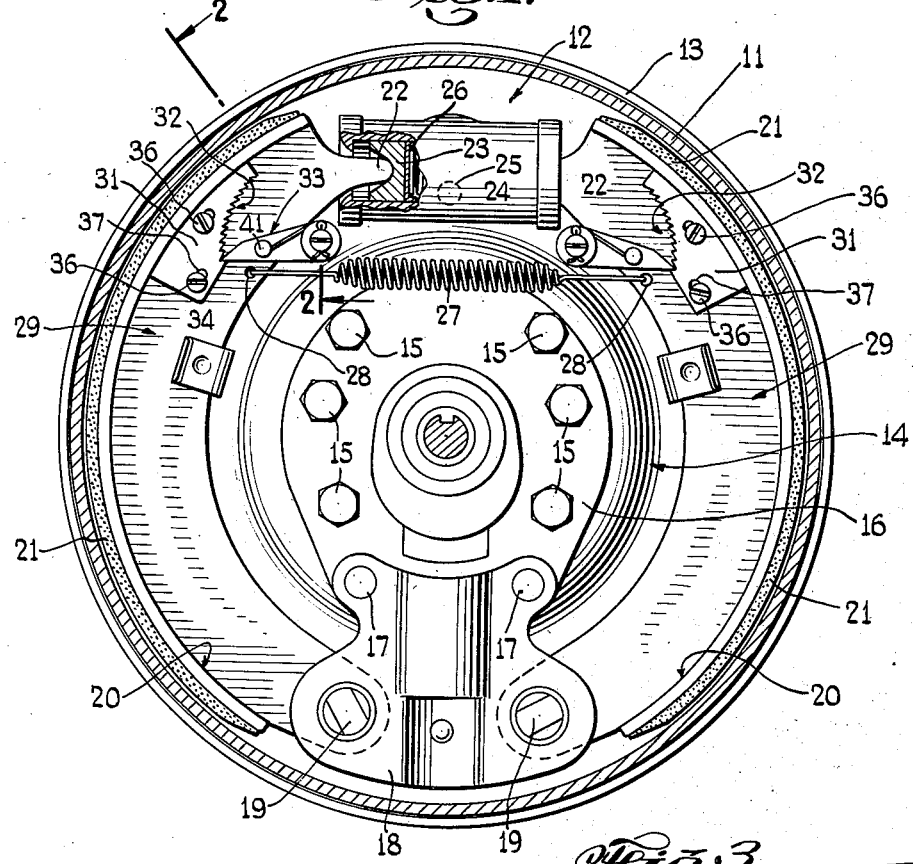
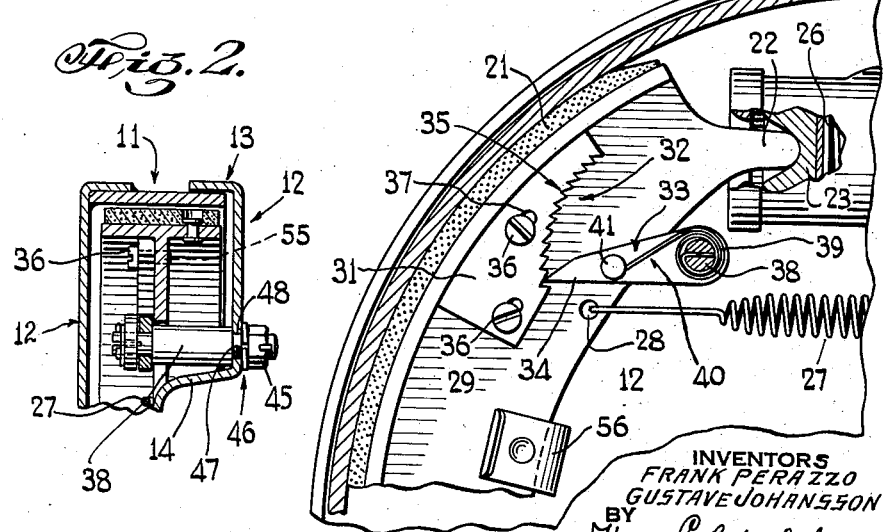
INVENTORS
FRANK PERAZZO
GUSTAVE JOHANSSON
BY
Armand E Lackenbach
ATTORNEY Dec. 1, 1936.    F. PERAZZO ET AL    2,062,819
BRAKE ADJUSTING DEVICE
Filed May 24, 1935    2 Sheets-Sheet 2

INVENTORS
FRANK PERAZZO.
GUSTAVE JOHANSSON
BY
ATTORNEY

Patented Dec. 1, 1936

2,062,819

UNITED STATES PATENT OFFICE 2,062,819

BRAKE ADJUSTING DEVICE

Frank Perazzo, Brooklyn, and Gustave Johansson, New York, N. Y.

Application May 24, 1935, Serial No. 23,138

4 Claims. (Cl. 188—79.5)

This invention relates to braking devices for vehicles, especially to hydraulic or other brakes of the expanding (double) shoe type for automotive vehicles, and more particularly to self-acting means for effecting automatic adjustments of the relative positions of the braking instrumentalities to compensate for wear on the brake-shoe linings.

An object of the invention is to provide an inexpensive automatic adjusting means, easily applied to existing brake assemblies without the need for extensive changes of structure.

Another object is to provide such an adjusting means which is extremely sturdy, reliable in operation, and will effect automatic adjustments invariably when required, as often as required, and to the extent then necessary, throughout the useful life of a brake lining, without the need for attention of a mechanic.

Still another object of the invention is to provide such an adjusting means which will maintain automatically an effective adjustment by which the brake shoe will be consistently held within a few millimeters (preferably not over $\frac{1}{32}$ of an inch) from its cooperating braking surface.

Another object is to provide a novel adjusting unit having the above characteristics, and capable of equally serviceable application in association with either shoe of a pair so that with two independently operating adjusters so installed, provision can be made for individual compensatory adjustment of unequally wearing shoes.

Among other objects is the provision of a novel type of adjustive device capable of application with widely diverse types of brakes throughout the multifarious series of automobiles on the market, whether of recent or older models, the adjusters being adapted for inclusion as standard equipment in practically all cars of the most modern design, without special provision, even in brake assemblies characterized by very compact design and narrow clearances.

Other objects of the invention will become apparent as the description of the particular embodiment selected for illustration and description herein progresses, and the novel features will be particularly pointed out in the claims.

In the drawings,

Fig. 1 is a view in vertical medial section of a brake assembly in the construction of which the invention has been embodied.

Fig. 2 is a fragmentary sectional view on the line II—II of Fig. 1.

Fig. 3 is a fragmentary detail view on an enlarged scale of one of the adjusting devices and the parts with which it is associated, as shown in Fig. 1.

Figure 4:
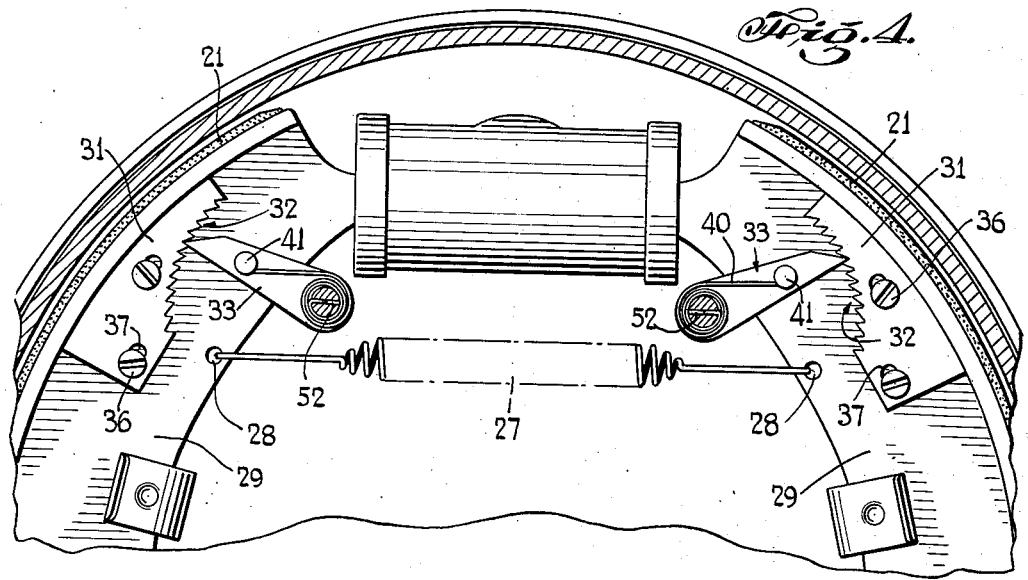
Fig. 4 is a view similar to Fig. 3, but showing both of the adjusting devices of a set, and in an advanced position.

Referring particularly to the drawings, in the now-preferred embodiment of the invention selected for illustration, the reference character 11 designates a rotatable brake member constituted by the conventional automotive-wheel drum of an internal expanding brake assembly, which includes also a stationary dust plate 12 having a rim or flange 13 fitting over the member 11, the latter being shown in section herein.

In this type of brake assembly the central web 14 of the dust plate is dished inwardly toward the medial plane of the assembly, and is there bolted, as at 15, to a web plate 16, and the latter is fixed, as by rivets 17, to a member 18 on which are mounted fulcrum pivots 19, one for each of the brake-shoes or rocking members 20, these being of the usual expanding type, symmetrical, with respect to each other, and so designated by like reference characters in the following description. These members are of T-shape in cross-section, and each is provided at 21 with a lining which is consumable gradually wearing away, so that adjustments in the range of play of the shoes 20 on their pivots 19 must be provided for, as is well known to those familiar with the operation of such brakes.

The free ends 22 of the shoes or levers 20 are spaced apart and disposed in opposed relation to each other for engagement with, and actuation by, the brake-operating instrumentalities, including in this instance, for each brake shoe lever, a piston 23 working in usual fashion in a fluid-pressure cylinder 24 mounted on the dust plate 12, and activated by hydraulic pressure suitably furnished through a port 25 from any suitable source thereof, such as a pedal-operated pump (not shown).

The pistons 23, of which only one is shown, are desirably biased apart, and are brought into contact with their cooperating lever ends 22, by a coil spring 26, under compression. A stronger coil spring 27, under tension, is desirably utilized, in usual fashion, as a means to bias the brake shoes 20 away from contact with the rotating wheel drum 11, when the brakes are not in action.

It is desirable that when the brakes are applied, the braking contact of lining 21 with the wheel drum 11 shall be made effective as rapidly as possible, for obvious and well-known reasons, already stated, and as a clearance of a few millimeters is ample to insure freedom of rotation as between the co-acting braking parts, the provision now to be described for automatic adjustments, when and as required, is designed to maintain each brake shoe with its lining 21 at substantially one thirty-second of an inch from the drum 11, however much the lining may be worn down, such wear being illustrated in Fig. 4 as compared with the initial state of the lining as shown in Fig. 1.

In the now-preferred embodiment illustrated in the drawings an independently acting automatic adjusting device is provided for each of the brake shoes, and as they are preferably identical in structure and operation, only one need be described in detail, as follows:

Each of said adjusters comprises a ratchet member or abutment 31 adapted to be fixed upon the web 29 of its brake lever and having an arcuate serrated portion 32 of predetermined radius of curvature, and each comprises a cooperating pawl 33 adapted to have its free end 34 engaged in a self-selective manner with the teeth 35 constituting said serrated part (see Fig. 3). The arcuate abutment plates or abutments 31 may desirably be secured by screws 36 passing through slots 37 to afford some opportunity for initial adjustment of these abutments, by way of adaptation to the different structures of various types of brakes, but once made it is preferred that this initial adjustment be permanent.

Each pawl 33 is preferably mounted upon the dust plate 12 adjacent to the shoe 29 to be influenced, and as a convenient form of means to afford a fulcrum for said pawl, the drawings show a post 38 disposed eccentrically with relation to said arcuate serrated abutment 32, and means 39 consisting of a coil spring, to bias said pawl swingingly against said teeth 35 as indicated in Fig. 3.

The tail 40 of the spring is pegged to the pawl, as at 41, affording adequate rotative leverage, so that when installed in combination with said brake assembly, the spring cooperates to interpose said pawl as a constantly effective strut in progressive relation between said pivoted fulcrum 38 and the serrated part 32, and as the lining 21 on said brake shoe is consumed in use, said pawl will be biased progressively forwardly to engagement with successive teeth as shown in Fig. 4.

The depth of the teeth affords inter-tooth spaces 35 (see Fig. 3) permitting sufficient play of the shoe 29 away from the drum 11 to afford adequate conventional or predetermined clearance of the lining 21 from engagement with the drum when the brake is not applied.

Figures 5, 6:
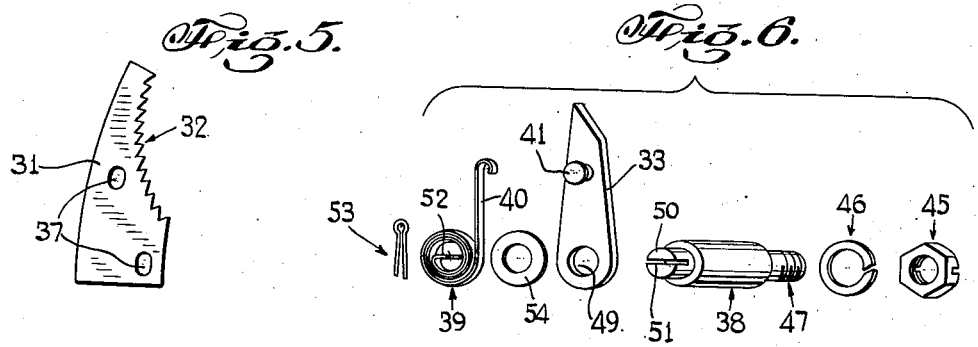
Fig. 5 is a diagram showing the layout of a serrated arcuate abutment.
Fig. 6 is an exploded view of one of the adjusters illustrated in Fig. 1, the components being shown in approximately their relative positions ready for installation.

Preferably the teeth will be so generated, as indicated in Fig. 5, that there will be, in every relative position of the parts, the same desirable clearance, so that the brake shoes and each of them, may be set against the drum 11 uniformly, and with the minimum of travel, whenever the user presses on the foot-pedal, or other operating lever, to furnish the hydraulic pressure necessary to force apart the pistons 23 in fluid pressure cylinder 24 and thus expand the brake-shoes 29 against the rotary wheel drum 11.

The user is thus assured of rapid, effective braking action throughout the life of the brake lining, and when the pawl 33 has, in the course of its adjustive progress, finally swung out past the last tooth of the serrated, arcuate face 32, the user will at once become aware that a replacement of the lining is necessary by reason of a looseness of operation that cannot be mistaken for that due to partial wear.

When the new lining has been installed upon the brake shoes, the adjusters need only be reset in their initial position (see Fig. 1) without need for any replacements of any of the adjuster parts by new parts, as the adjusters are preferably made of adequately hard metal to withstand for a long period the slight wear to which they are subjected. The tension on spring 27 is a measure of the slight compression factor the pawls have to sustain in their capacity as struts. The progress of each pawl from tooth to tooth of the serrated abutment is very gradual and awaits the necessary clearance over the apex of a tooth before the step takes place. There is but little wear at this point.

It is to be noted that the nature of the supporting post 38 is such that it can be of small enough diameter to be mounted in the trough-like annular space between the web 29 of the brake shoe and the dished central portion 14 of dust plate 12, without diminishing its strength, and the posts 38 can be made of standard form, as they are readily applicable to the available space in a great majority of the types of cars in use today.

The same is true of the parts associated with said posts, which are shown illustratively in Fig. 6, comprising, in this instance, a nut 45 and lock washer 46 to be engaged with the corresponding screw-threaded end 47 of the post, which is reduced in diameter so as to be seated (see Fig. 2) in an orifice 48 in the dust plate; and also is true of the pawl 33 already described generally, and which has a pierced end 49 adapted to slip over the reduced end 50 of the post 38, this end having an open slot 51 to receive and hold the inner end 52 of the spring 39; the shoulder 53 of the post acts as a side bearing for the pawl, and the latter is held for easy rotation on the end 50 by suitable retaining means, such as a cotter-pin 53 and washer 54. All these parts are easily and inexpensively fabricated and assembled and any of them can be replaced out of stock at slight expense.

The whole assembly can be installed in a short time, say concurrently with the installation of new brake-shoe linings, thus making the expense and disuse of the car a matter of minor consideration as compared with the enhanced safety secured by properly and frequently adjusted brakes.

The installation of each of the adjusters illustrated in the present drawings, requires only the drilling of three small holes, viz., that designated 48 in the dust plate (see Fig. 2) for the end 47 of post 38, and those designated 55 in the brake shoe web 29. These latter two holes may be tapped with a screw-thread to facilitate setting of the screws 36 to fix the abutment plate 31 in place, but this is not intended to exclude the use of "stove-bolts" or other fastening means which do not involve even the simple threading operation, so that a minimum of mechanical skill is required to apply or adjust the adjuster parts, and no tool equipment is required other than that usually found at a wayside filling station, for example.

The reference character 28 in Fig. 3 designates an orifice in the web 29 of the brake-shoe in which is hooked the end of tension spring 27, and while the pawl 33 is shown as near the same, there is no interference between these parts. If desirable such proximity can be easily avoided. Plenty of space is also left for such conventional attachments as the anti-rattler clip 56.

In operation, the parts being in the position shown in Fig. 3, with the pawl 33 at the lowest notch of the serrated face 32, upon depression of the conventional brake pedal or lever (not shown), the brake shoes 29 will be forced outwardly to bring the linings 21 respectively into braking engagement with the drum 11, and such engagements may be made an indefinite number of times while the pawl 33 remains behind the first tooth of the serrated face, until wear of the linings 21, or one of them, permits expansion of a braking member 29 to such an extent that the nose of each pawl 33, or of one of them, escapes past the first tooth, whereupon its further swinging adjustment under the action of the spring 39 will bring the pawl against the next tooth, and this compensating action will be repeated until the entire lining of each of the brakes shall have been consumed.

The brake shoes can then be relined in the conventional manner, and the adjusters will continue to operate in the automatic fashion described for a period in great excess of the effective life of numerous linings, for the reason that there is never any considerable strain exerted upon the adjuster components.

Although we have particularly described one particular embodiment of our invention and explained the principle, construction and mode of operation thereof, nevertheless we desire to have it understood that the form selected is merely illustrative and does not exhaust the possible physical embodiments of the idea of means underlying our invention.

We claim:

1. The combination with a rotatable brake drum and an oscillating brake shoe having a lining adapted for frictional engagement with said drum, of automatic adjusting means to compensate for wear of the brake, said adjusting means including an abutment member mounted upon said shoe and having an arcuate, serrated abutment face, a support upon which said oscillating brake shoe is mounted pivotally, a pawl mounted pivotally upon said support with its free end adapted to swing around in juxtaposition with said arcuate serrated face; said pawl having its axis of rotation eccentric to the radius of said arcuate serrated face so that as said pawl swings past said arcuate face it acts to prevent retrogressive movement of said abutment member and of the brake shoe on which it is mounted; and means tending to bias said pawl swingingly towards the nearer portion of said abutment; the clearance between the teeth of said serrated portion permitting the conventional clearance movement of said brake shoe away from the brake drum when said brake is out of braking action.

2. The combination with a rotatable brake drum and an oscillating brake shoe having a lining adapted for frictional engagement with said drum of automatic adjusting means to compensate for wear of the brake, said adjusting means including an abutment mounted upon said shoe and having an arcuate, serrated abutment face, a support upon which said oscillating brake shoe is mounted pivotally, a fulcrum post fixed upon said support and disposed near said arcuate abutment, and a pawl mounted pivotally upon said post and disposed thereon in position to swing around said post with its free end in juxtaposition with said arcuate serrated face; said pawl having its axis of rotation eccentric to the radius of said arcuate serrated face so that as said pawl swings past said arcuate face it acts to prevent retrogressive movement of said abutment member and of the brake shoe on which it is mounted; and means tending to bias said pawl swingingly towards the nearer portion of said abutment; the clearance between the teeth of said serrated portion permitting the conventional clearance movement of said brake shoe away from the brake drum when said brake is out of braking action.

3. An adjusting device for a brake shoe in a braking assembly of the type characterized by a support, a brake lever mounted pivotally on said support, a brake-shoe carried by said lever, and having a renewable lining, a cooperating relatively rotating braking element, manually controlled means to swing said lever to bring said shoe lining into braking engagement with said cooperating element, and means by which said brake-shoe is biased away from said cooperating element; said device comprising a ratchet member adapted to be fixed upon said brake lever and having an arcuate serrated portion of predetermined radius or curvature, a pawl adapted to have its free end engaged selectively with the teeth constituting said serrated part, a pivot member adapted to be fixed upon said support adjacent to said lever and serving to afford a fulcrum for said pawl disposed eccentrically with relation to said arcuate serrated part, and means to bias said pawl swingingly against said teeth, said parts cooperating, when installed in combination with said assembly, to interpose said pawl as a strut in progressive relation between said pivotal fulcrum and serrated part, so that as the lining on said brake-shoe wears, said pawl will be biased forwardly to engagement with successive teeth, the depth of the teeth affording inter-tooth spaces permitting sufficient play of said lever to afford adequate conventional or predetermined clearance of the shoe lining from engagement with the cooperating braking member when the brake is not applied.

4. In a brake assembly of the class described, comprising a rotatable brake drum, a dust plate therefor, and an oscillating arcuate brake shoe formed with an inwardly extending radial web and having a consumable exterior lining to engage said drum interiorly, an adjuster including a planiform abutment member mounted on said web and having a serrated arcuate edge presented inwardly from said shoe and disposed eccentrically thereof, said adjuster including also a pawl mounted pivotally upon a post fixed upon said dust plate and means to bias said pawl swingingly along said serrated edge in order to engage teeth progressively nearer to said arcuate shoe as said lining is consumed.

FRANK PERAZZO.
GUSTAVE JOHANSSON.